United States Patent
Ramina et al.

(10) Patent No.: US 11,654,452 B2
(45) Date of Patent: May 23, 2023

(54) APPARATUSES AND METHODS USING HIGH PRESSURE DUAL CHECK VALVE

(71) Applicant: MICROFLUIDICS INTERNATIONAL CORPORATION, Westwood, MA (US)

(72) Inventors: Jocemar Ramina, Lexington, MA (US); Marco G. Catalani, Burlington, MA (US); John M. Bernard, Stoughton, MA (US); Michael P. Ratigan, Scituate, RI (US); David G. Harney, Stoneham, MA (US)

(73) Assignee: MICROFLUIDICS INTERNATIONAL CORPORATION, Westwood, MA (US)

( * ) Notice: Subject to any disclaimer, the term of this patent is extended or adjusted under 35 U.S.C. 154(b) by 0 days.

(21) Appl. No.: 17/403,152

(22) Filed: Aug. 16, 2021

(65) Prior Publication Data

US 2021/0370346 A1   Dec. 2, 2021

Related U.S. Application Data

(63) Continuation of application No. 15/872,332, filed on Jan. 16, 2018, now Pat. No. 11,090,680.
(Continued)

(51) Int. Cl.
*F16K 15/04* (2006.01)
*B05C 17/005* (2006.01)
(Continued)

(52) U.S. Cl.
CPC .. *B05C 17/00553* (2013.01); *B05C 17/00576* (2013.01); *B05C 21/00* (2013.01);
(Continued)

(58) Field of Classification Search
CPC ........ B05C 17/00553; B05C 17/00576; B05C 21/00; F16K 11/105; F16K 15/042; F16K 15/044
See application file for complete search history.

(56) References Cited

U.S. PATENT DOCUMENTS

| 619,680 A | 2/1899 | Dom |
|---|---|---|
| 1,000,641 A | 8/1911 | Tebbit |

(Continued)

FOREIGN PATENT DOCUMENTS

| CN | 2243583 | 12/1996 |
|---|---|---|
| CN | 102141165 | 8/2011 |

(Continued)

OTHER PUBLICATIONS

First Office Action issued for Chinese Patent Application No. 201880018814.4, English summary.
(Continued)

*Primary Examiner* — P. Macade Nichols
(74) *Attorney, Agent, or Firm* — K&L Gates LLP (57) ABSTRACT

Apparatuses and methods related to a high pressure fluid processing device having a dual check valve setup that can be quickly and easily maintained with replacement parts are disclosed herein. In a general example embodiment, a high pressure processing device includes a body including a first surface having a first recess, a second surface having a second recess, and a third surface having a third recess, a first subassembly at least partially inserted into the first recess of the body, the first subassembly including a first check valve, a second subassembly at least partially inserted into the second recess of the body, the second subassembly including a second check valve, and a third subassembly at least partially inserted into the third recess of the body, the third subassembly coupling the body to a fluid driving mechanism, wherein the first subassembly, second subas-
(Continued)

sembly and third subassembly are configured to be independently attachable to and detachable from the first recess, second recess and third recess, respectively.

20 Claims, 6 Drawing Sheets

Related U.S. Application Data (60) Provisional application No. 62/447,070, filed on Jan. 17, 2017.

(51) Int. Cl.
  *B05C 21/00* (2006.01)
  *F16K 11/10* (2006.01)

(52) U.S. Cl.
  CPC .......... *F16K 11/105* (2013.01); *F16K 15/042* (2013.01); *F16K 15/044* (2013.01)

(56) References Cited

U.S. PATENT DOCUMENTS

| | | |
|---|---|---|
| 1,270,961 A | 7/1918 | Lippert |
| 2,046,223 A | 6/1936 | Trudel et al. |
| 2,555,597 A | 6/1951 | Nault |
| 2,832,573 A | 4/1958 | Rees |
| 2,901,981 A | 9/1959 | Wakeman |
| 3,009,476 A | 11/1961 | Usab |
| 3,182,971 A | 5/1965 | Wakeman et al. |
| 3,799,194 A | 3/1974 | Bedo et al. |
| 3,810,716 A | 5/1974 | Abrahams et al. |
| 3,818,807 A | 6/1974 | Semple |
| 3,828,929 A | 8/1974 | Hickey, Jr. |
| 4,233,886 A | 11/1980 | Balzano et al. |
| 4,387,736 A * | 6/1983 | Major ................. F04B 11/0033 137/533.15 |
| 4,393,895 A | 7/1983 | Rubey |
| 4,477,236 A | 10/1984 | Elliott |
| 4,691,620 A | 9/1987 | Kao |
| 4,773,833 A | 9/1988 | Wilkinson et al. |
| 4,862,911 A | 9/1989 | Yie |
| 4,974,628 A | 12/1990 | Tepermeister |
| 5,148,828 A | 9/1992 | Farnham |
| 5,237,407 A | 8/1993 | Crezee et al. |
| 5,297,580 A | 3/1994 | Thurman |
| 5,411,380 A | 5/1995 | Bristol et al. |
| 5,852,076 A | 12/1998 | Serafin et al. |
| 6,135,628 A | 10/2000 | Destefano et al. |
| 6,206,032 B1 | 3/2001 | Hill |
| 6,221,332 B1 | 4/2001 | Thumm et al. |
| 6,328,542 B1 | 12/2001 | Serafin et al. |
| 6,551,367 B2 | 4/2003 | Lee et al. |
| 6,827,479 B1 | 12/2004 | Xia et al. |
| 7,118,349 B2 | 10/2006 | Oglesby |
| 8,052,076 B2 | 11/2011 | Greenwood et al. |
| 8,746,962 B2 | 6/2014 | Gandini et al. |
| 9,327,039 B2 | 5/2016 | Greenwood et al. |
| 2001/0041206 A1 | 11/2001 | Raghavan et al. |
| 2003/0085308 A1 | 5/2003 | Parrish |
| 2004/0187943 A1 | 9/2004 | Bennett |
| 2005/0126638 A1 | 6/2005 | Gilbert |
| 2005/0229975 A1 | 10/2005 | Moe et al. |
| 2009/0000667 A1 | 1/2009 | Bottura |
| 2014/0202406 A1 | 7/2014 | Nakamura |
| 2014/0261739 A1 * | 9/2014 | Fulkerson ........... F04B 43/0054 137/15.08 |

FOREIGN PATENT DOCUMENTS

| | | |
|---|---|---|
| CN | 204372257 | 6/2015 |
| CN | 205859326 | 1/2017 |
| DE | 19626246 | 1/1998 |
| EP | 0102724 | 3/1984 |
| EP | 2090353 | 8/2009 |
| EP | 2586521 | 5/2013 |
| JP | S49-122109 | 4/1976 |
| JP | S54-054336 | 4/1979 |
| JP | S59-051172 | 3/1984 |
| JP | H02-059698 | 1/1991 |
| JP | H03-275983 | 12/1991 |
| JP | 2005-009506 | 1/2005 |
| WO | WO 2006/105870 | 10/2006 |
| WO | WO 2009/033000 | 3/2009 |

OTHER PUBLICATIONS

Extended European Search Report issued for European Patent Application No. 18742101.1.

Microfluidics International Corporation, prior device sold in the United States, (at least as early as) Jan. 1, 2015.

High Pressure Equipment, High Pressure Valves. Fitting and Tubing, pp. 4.6 (dated Aug. 2004) and 4.8 (dated Dec. 1999).

Search Report and Written Opinion dated Jul. 2, 2018 for International PCT Application No. PCT/US18/13850.

* cited by examiner

APPARATUSES AND METHODS USING HIGH PRESSURE DUAL CHECK VALVE

PRIORITY

The present application is a continuation application of U.S. patent application Ser. No. 15/872,332 filed on Jan. 16, 2018, which claims priority to U.S. Provisional Application No. 62/447,070, filed Jan. 17, 2017, The entire contents of said applications are incorporated herein by reference and relied upon.

FIELD OF THE INVENTION

The present disclosure generally relates to apparatuses and methods related to a high pressure fluid processing device, and more specifically to a high pressure mixer or homogenizer having a dual check valve setup that can be quickly and easily maintained with replacement parts.

BACKGROUND

High pressure fluid processing devices can be used for a variety of purposes, such as mixing or homogenizing unprocessed material. For example, homogenizers push unprocessed material through orifices at a high pressure, resulting in targeted particle size reduction or molecule formation. Impinging jet reactors also use high pressure for nanocrystallization.

SUMMARY

The present disclosure provides apparatuses and methods related to a high pressure fluid processing device having a dual check valve setup that can be quickly and easily maintained with replacement parts, and that reduces the total number of parts compared to other designs with a similar function. In a general example embodiment, a high pressure processing device includes including a first surface having a first recess, a second surface having a second recess, and a third surface having a third recess, a first subassembly at least partially inserted into the first recess of the body, the first subassembly including a first check valve, a second subassembly at least partially inserted into the second recess of the body, the second subassembly including a second check valve, and a third subassembly at least partially inserted into the third recess of the body, the third subassembly coupling the body to a fluid driving mechanism, wherein the first subassembly, second subassembly and third subassembly are configured to be independently attachable to and detachable from from the first recess, second recess and third recess, respectively.

In another example embodiment, the first check valve is a first ball valve, and the second check valve is a second ball valve.

In another example embodiment, an inner surface of at least one of the first recess, second recess and third recess is threaded for attachment of the first subassembly, second subassembly or third subassembly, respectively.

In another example embodiment, the first subassembly, second subassembly and third subassembly are configured to be threaded into the body independently of each other.

In another example embodiment, the fluid driving mechanism is a piston, the third subassembly includes a coupling and a piston housing, and the coupling at least partially inserted into the third aperture to enable the piston to move back and forth within the piston housing to impart a positive or negative pressure through the third recess.

In another example embodiment, the piston does not extend into the third recess when driving fluid through the first and second recesses.

In another example embodiment, the first recess and the second recess are in fluid communication via a connecting channel formed in the body.

In another example embodiment, the connecting channel has a smaller diameter than the first recess or the second recess.

In another example embodiment, the connecting channel is a first connecting channel, and wherein the third recess is in fluid communication with the first and second recesses via a second connecting channel formed in the body to be connected to the first connecting channel.

In another example embodiment, the second connecting channel is perpendicular to the first connecting channel.

In another example embodiment, the first recess, the second recess and the third recess are all in fluid communication via at least one connecting channel formed in the body.

In another example embodiment, at least one of the first subassembly or the second subassembly includes a deformable material that cooperates with a ball to form the check valve.

In another example embodiment, the deformable material is located within an indentation formed into a valve seat that receives the ball.

In another example embodiment, the device does not include any gaskets, o-rings and/or other deformable materials.

In another example embodiment, at least one of the first subassembly and the second subassembly does not include a gasket, o-ring and/or other deformable material.

In another example embodiment, the device does not include any gaskets, o-rings and/or other deformable materials contacting an inner surface of at least one of the first recess or second recess.

In another example embodiment, does not include any gaskets, o-rings and/or other deformable materials contacting an inner surface of the third recess.

In another example embodiment, a method of repairing the high pressure processing device includes removing one of the first subassembly, second subassembly and third subassembly from the body independently of the others of the first subassembly, second subassembly and third subassembly, replacing a part of the removed first subassembly, second subassembly or third subassembly, and reattaching the removed first subassembly, second subassembly or third subassembly with the replacement part.

In another example embodiment, a method of producing a fluid dispersion includes passing a flowable material including particles through the device.

In another example embodiment, a method of reducing particle size includes passing a particle stream through the device.

In another general example embodiment, a high pressure processing device includes a first surface having a first recess and a second surface having a second recess, the second surface located opposite to the first surface, a first subassembly inserted into the first recess of the body, the first subassembly including a first plug configured to form a one-way valve in combination with a first valve seat, and a second subassembly inserted into the second recess of the body, the second subassembly including a second plug configured to form a one-way valve in combination with a second valve seat, wherein the first recess is fluidly connected to the second recess by a connecting channel such that the first recess, second recess and connecting channel form an aperture extending straight through the body from the first outer surface to the opposite second outer surface.

In another example embodiment, the first subassembly and the second subassembly are configured to be independently attachable to and removable from the first recess and second recess, respectively.

In another example embodiment, the device includes a third subassembly inserted into a third recess on a third outer surface of the body, the third subassembly coupling the body to a fluid driving mechanism.

In another example embodiment, the third outer surface is approximately perpendicular to the first surface and the second surface.

In another example embodiment, the connecting channel is a first connecting channel, and wherein the third recess is fluidly connected to the first recess and the second recess by a second connecting channel connected to the first connecting channel.

In another example embodiment, the first subassembly includes a first gland configured to be threaded into threads on an inner surface of the first recess, and the second subassembly includes a second gland configured to be threaded into threads on an inner surface of the second recess.

In another example embodiment, the first subassembly includes one or more of a first biasing element retainer, a first biasing element, a first plug, a first deformable material, a first valve seat and a first subassembly gland.

In another example embodiment, the first subassembly consists of one or more of a first biasing element retainer, a first biasing element, a first plug, a first deformable material, a first valve seat and a first subassembly gland.

In another example embodiment, the second subassembly includes one or more of a second valve seat, a second deformable material, a second plug, a second biasing element, a second biasing element retainer, a second channel member and a second subassembly gland.

In another example embodiment, the second subassembly consists of one or more of a second valve seat, a second deformable material, a second plug, a second biasing element, a second biasing element retainer, a second channel member and a second subassembly gland.

In another example embodiment, a method of repairing the high pressure processing device includes removing one of the first subassembly and second subassembly from the body independently of the other of the first subassembly and second subassembly, replacing a part of the removed first subassembly or second subassembly, and reattaching the removed first subassembly or second subassembly with the replacement part.

In another example embodiment, a method of producing a fluid dispersion includes passing a flowable material including particles through the device.

In another example embodiment, a method of reducing particle size includes passing a particle stream through the device.

In another general example embodiment, a high pressure processing device includes a body including a fluid flowpath extending therethrough, a coupling including a first end, a second end and a channel extending from the first end to the second end, the first end of the coupling threading to threads on an inner surface of a recess formed in the body, a piston housing removably attachable to the second end of the coupling, the piston housing including an inner compartment placed in fluid communication with the recess of the body by the channel of the coupling, and a piston actuatable within the inner compartment of the piston housing, wherein actuating the piston back and forth within the inner compartment of the piston housing causes fluid to flow through the fluid flowpath of the body.

In another example embodiment, the piston does not extend into the body when actuating back and forth to cause fluid to flow through the fluid flowpath of the body.

In another example embodiment, the coupling is attached to the body only by threading the first end of the coupling inside the recess.

In another example embodiment, the fluid flowpath extends from a first outer surface of the body to a second outer surface of the body, and the recess is located in a third outer surface of the body different from the first and second surfaces.

In another example embodiment, the fluid flowpath extends parallel to an outer surface of the body including the recess.

In another example embodiment, the device includes a first subassembly at least partially inserted into a different recess in the body, the first subassembly including a first check valve and forming at least part of the fluid flowpath.

In another example embodiment, the device includes a second subassembly at least partially inserted into a second different recess in the body, the second subassembly including a second check valve and forming at least part of the fluid flowpath.

In another example embodiment, the first subassembly, second subassembly and third subassembly are configured to be independently attachable to and removable from the body.

In another example embodiment, a method of producing a fluid dispersion includes passing a flowable material including particles through the device.

In another example embodiment, a method of reducing particle size includes passing a particle stream through the device.

In another general example embodiment, a high pressure processing device includes a first check valve assembly, the first check valve assembly including a first body including a first recess, a second recess, and a third recess, a first subassembly including a first check valve, the first subassembly inserted at least partially into the first recess of the first body, a second subassembly including a second check valve, the second subassembly inserted at least partially into the second recess of the first body, and a third subassembly coupling the body to a fluid driving mechanism, the third subassembly inserted at least partially into the third recess of the first body, and a second check valve assembly, the second check valve assembly including a second body including a first recess, a second recess, and a third recess, a first subassembly including a first check valve, the first subassembly inserted at least partially into the first recess of the second body, a second subassembly including a second check valve, the second subassembly inserted at least partially into the second recess of the second body, and a third subassembly coupling the body to a fluid driving mechanism, the third subassembly inserted at least partially into the third recess of the second body, wherein the first body and the second body are physically separate bodies, and the first, second and third subassemblies attached to one of the first and second bodies can be serviced without disrupting the other of the first and second bodies.

In another example embodiment, a method of producing a fluid dispersion includes passing a flowable material including particles through the device.

In another example embodiment, a method of reducing particle size includes passing a particle stream through the device.

In another general example embodiment, a method of repairing a high pressure processing device including a body, a first subassembly including a first check valve, a second subassembly including a second check valve, and a third subassembly coupling the body to a fluid driving mechanism, includes removing one of the first subassembly, second subassembly and third subassembly from the body independently of the others of the first subassembly, second subassembly and third subassembly, replacing a part of the removed first subassembly, second subassembly or third subassembly, and reattaching the removed first subassembly, second subassembly or third subassembly with the replacement part.

In another example embodiment, removing one of the first subassembly, second subassembly and third subassembly from the body includes unthreading the one of the first subassembly, second subassembly and third subassembly from an inner surface of a recess of the body.

In another example embodiment, reattaching the removed first subassembly, second subassembly or third subassembly with the replacement part includes threading the removed first subassembly, second subassembly or third subassembly to an inner surface of a recess of the body.

In another example embodiment, the method includes removing the first subassembly from the body independently of the second subassembly and the third subassembly, and replacing a part of the first subassembly includes replacing one or more of a first biasing element retainer, a first biasing element, a first plug, a first deformable material, a first valve seat and a first subassembly gland of the first subassembly.

In another example embodiment, removing the first assembly includes unthreading the first subassembly gland of the first subassembly from an inner surface of a recess of the body.

In another example embodiment, the method includes removing the second subassembly from the body independently of the first subassembly and the third subassembly, and replacing a part of the second subassembly includes replacing one or more of a second valve seat, a second deformable material, a second plug, a second biasing element, a second biasing element retainer, a second channel member and a second subassembly gland of the second subassembly In another example embodiment, removing the second assembly includes unthreading the second subassembly gland of the second subassembly from an inner surface of a recess of the body.

In another example embodiment, the method includes removing the third subassembly from the body independently of the first subassembly and the second subassembly, and replacing a part of the third subassembly includes replacing one or more of a piston, a piston housing and a coupling of the second assembly.

In another example embodiment, removing the third assembly includes unthreading the coupling of the third subassembly from an inner surface of a recess of the body.

In another example embodiment, removing the third subassembly includes unthreading the body from the third subassembly while leaving the third subassembly attached to a fluid driving mechanism at an opposite end.

BRIEF DESCRIPTION OF THE FIGURES

Embodiments of the present disclosure will now be explained in further detail by way of example only with reference to the accompanying figures, in which.

DETAILED DESCRIPTION

Before the disclosure is described, it is to be understood that this disclosure is not limited to the particular apparatuses and methods described. It is also to be understood that the terminology used herein is for the purpose of describing particular embodiments only, and is not intended to be limiting, since the scope of the present disclosure will be limited only to the appended claims.

As used in this disclosure and the appended claims, the singular forms "a," "an" and "the" include plural referents unless the context clearly dictates otherwise. The methods and apparatuses disclosed herein may lack any element that is not specifically disclosed herein. Thus, "comprising," as used herein, includes "consisting essentially of" and "consisting of."

FIGS. 1 to 6 show an example embodiment of a check valve assembly 10 for a high pressure processing device. In an embodiment, the high pressure processing device can be a high pressure mixer or homogenizer that operates, for example, at a pressure between 0 and 60,000 psi. In an embodiment, the high pressure processing device can include a plurality of the check valve assemblies 10 as disclosed herein, with each individual check valve assembly 10 as described herein being separate from each other check valve assembly 10, enabling each check valve assembly 10 to be individually serviced without disrupting each other check valve assembly 10.

Check valve assembly 10 includes a central body 12 with a plurality of recess located therein. In the illustrated embodiment, body 12 includes a first recess 14 configured to receive a first subassembly 16, a second recess 18 configured to receive a second subassembly 20, and a third recess 22 configured to receive a third subassembly 24. First recess 14 includes threads 14b on an inner surface thereof for threading to first subassembly 16, second recess 18 includes threads 18b on an inner surface thereof for threading to second subassembly 20, and third recess 22 includes threads 22a on an inner surface thereof for threading to third subassembly 24. Those of ordinary skill in the art will recognize that other couplings besides threads can be used to attach first subassembly 16, second subassembly 20 and/or third subassembly 24 to body 12.

Body 12 can be formed, for example, of metal, plastic, ceramic, carbon fiber/composite, and/or the like. In an embodiment formed of a high pressure processing device with a plurality of check valve assemblies 10, each check valve assembly 10 may include a separate body 12.

First recess 14 and second recess 18 extend into body 12 at opposite outer surfaces 24, 25 and are fluidly connected by a first connecting channel 26, such that first recess 14, second recess 18 and first connecting channel 26 form a fluid path extending from outer surface 24 to outer surface 25. In the illustrated embodiment, the fluid path formed by first recess 14, second recess 18 and first connecting channel 26 is located along a straight axis from outer surface 24 to outer surface 25. As illustrated, the diameter of first connecting channel 26 is thinner than the diameter at any portion of first recess 14 or second recess 18.

Third recess 22 extends into body 12 at a third outer surface 28 and is also fluidly connected with first recess 14 and second recess 18 via a second connecting channel 30 that connects to first connecting channel 26. In the illustrated embodiment, second connecting channel 30 is perpendicular to first connecting channel 26, and third recess 22 extends into body 12 in a direction perpendicular to first recess 14 and second recess 18, but those of ordinary skill in the art will recognize that other geometric configurations are possible. As illustrated, the diameter of second connecting channel 30 is thinner than the diameter at any portion of third recess 22. In the illustrated embodiment, the recesses and connecting channels are round, but those of ordinary skill in the art will recognize that other shapes are possible.

First subassembly 16 includes a plurality of parts that together form a first one-way check valve that can be easily inserted into and removed from first recess 14 without disturbing the parts located in other recesses. In the illustrated embodiment, first subassembly 16 includes a first biasing element retainer 32, a first biasing element 34, a first plug 36, a first deformable material 38, a first valve seat 40, and a first subassembly gland 42, which can be placed into first recess 14 as shown to form first subassembly 16 and attach first subassembly 16 to body 12. In the illustrated embodiment, first plug 36 is a ball, which in combination with other elements of first subassembly 16 forms a one-way ball valve. Those of ordinary skill in the art will recognize that other geometries besides a ball may be used for first plug 36. In the illustrated embodiment, first biasing element 34 is a spring, but those of ordinary skill in the art will recognize other biasing elements that can be used for first biasing element 34.

In the illustrated embodiment, first biasing element retainer 32 is inserted into first aperture 16 so that a curved surface 32a of first biasing element retainer 32 is placed against a corresponding curved surface 14a of first recess 14. As illustrated, curved surface 14a narrows to first connecting channel 26 and is sized to prevent the elements of first subassembly 16 from entering first connecting channel 26. First biasing element 34, here a spring, is placed against first biasing element retainer 32 around a protrusion 32b on the opposite end of first biasing element retainer 32 as compared to curved surface 32a, though those of ordinary skill in the art will recognize other ways for first biasing element retainer 32 to hold a first biasing element 34 such as a spring. First plug 36 is placed between first biasing element 34 and first valve seat 40, such that first plug 36 rests in a corresponding indentation 40a of first valve seat 40 when first biasing element 34 is extended towards first valve seat 40. In the illustrated embodiment, first deformable material 38 is placed in its own corresponding indentation in the perimeter of indentation 40a to ensure a fluid tight seal of channel 40b through the center of first valve seat 40 when first biasing element 34 is extended towards first valve seat 40 and first plug 36 is located within indentation 40a, but those of ordinary skill in the art will recognize that first deformable material 38 may not be necessary if first plug 36 is formed to match indentation 40a and provide the fluid tight seal of channel 40b through the center of first valve seat 40. The perimeter 40c of first valve seat 40 is placed within an aperture 42a through the center of first subassembly gland 42, and then the outer surface 42b of first subassembly gland 42 is threaded onto corresponding threads 14b on the inner surface of first recess 14. The angled surface 40d of first valve seat 40 abuts a corner 14c of first recess 14 in which the diameter of first recess 14c changes, eliminating the need for a gaskets, o-ring and/or other deformable material seal between first valve seat 40 and the inner surface of first recess 14.

The components of first subassembly 16 are arranged so that fluid can flow through first recess 14 to first connecting channel 26. First valve seat 40 includes channel 40b through the center thereof to permit fluid flow when indentation 40a is not sealed by first ball 36. First spring retainer 32 also includes an aperture therethrough or indention into an outside thereof to allow fluid to flow from channel 40b of first valve seat 40 to first connecting channel 26 when indentation 40a is not sealed by first plug 36.

Figure 1:
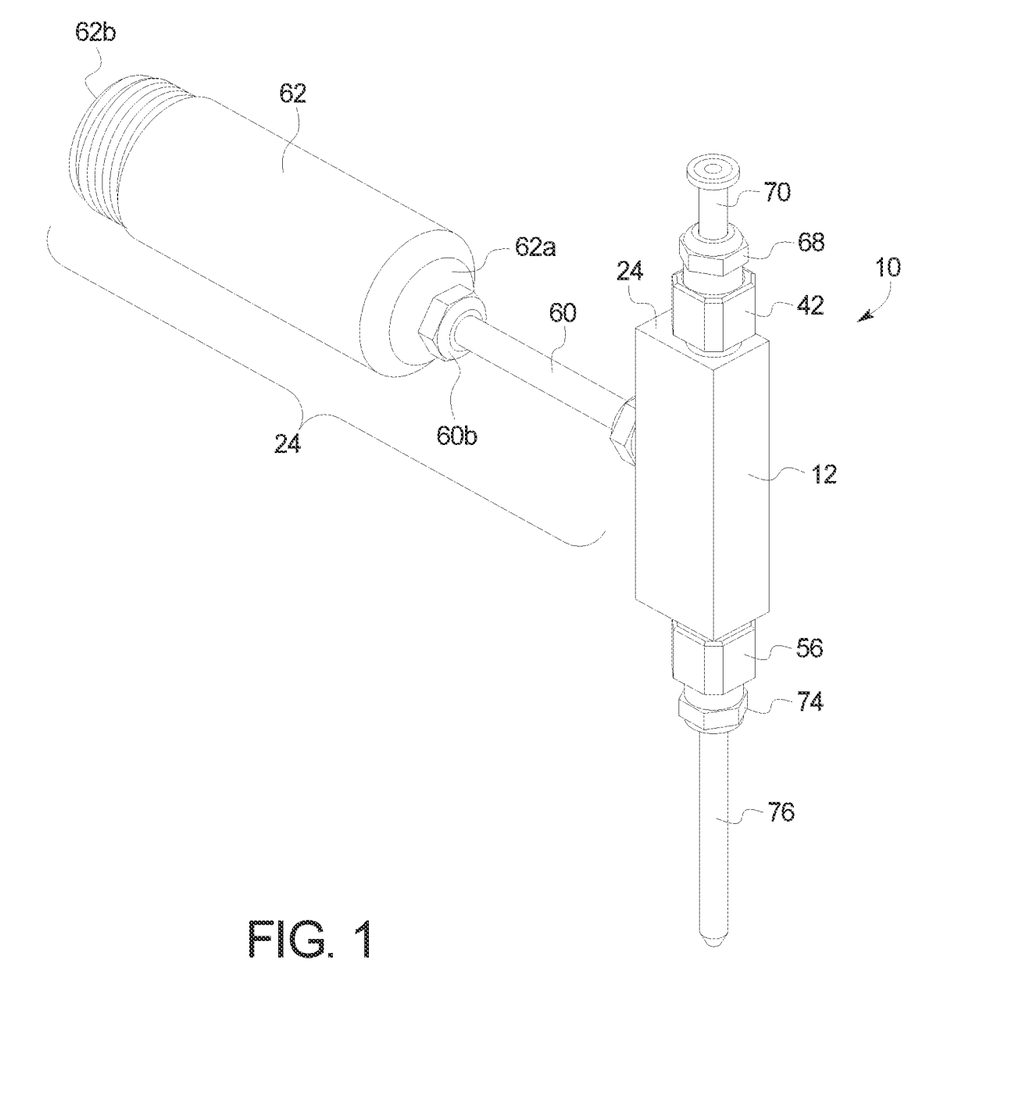
FIG. 1 shows a perspective view of an example embodiment of a check valve assembly for a high pressure processing device according to the present disclosure.
Figure 2:
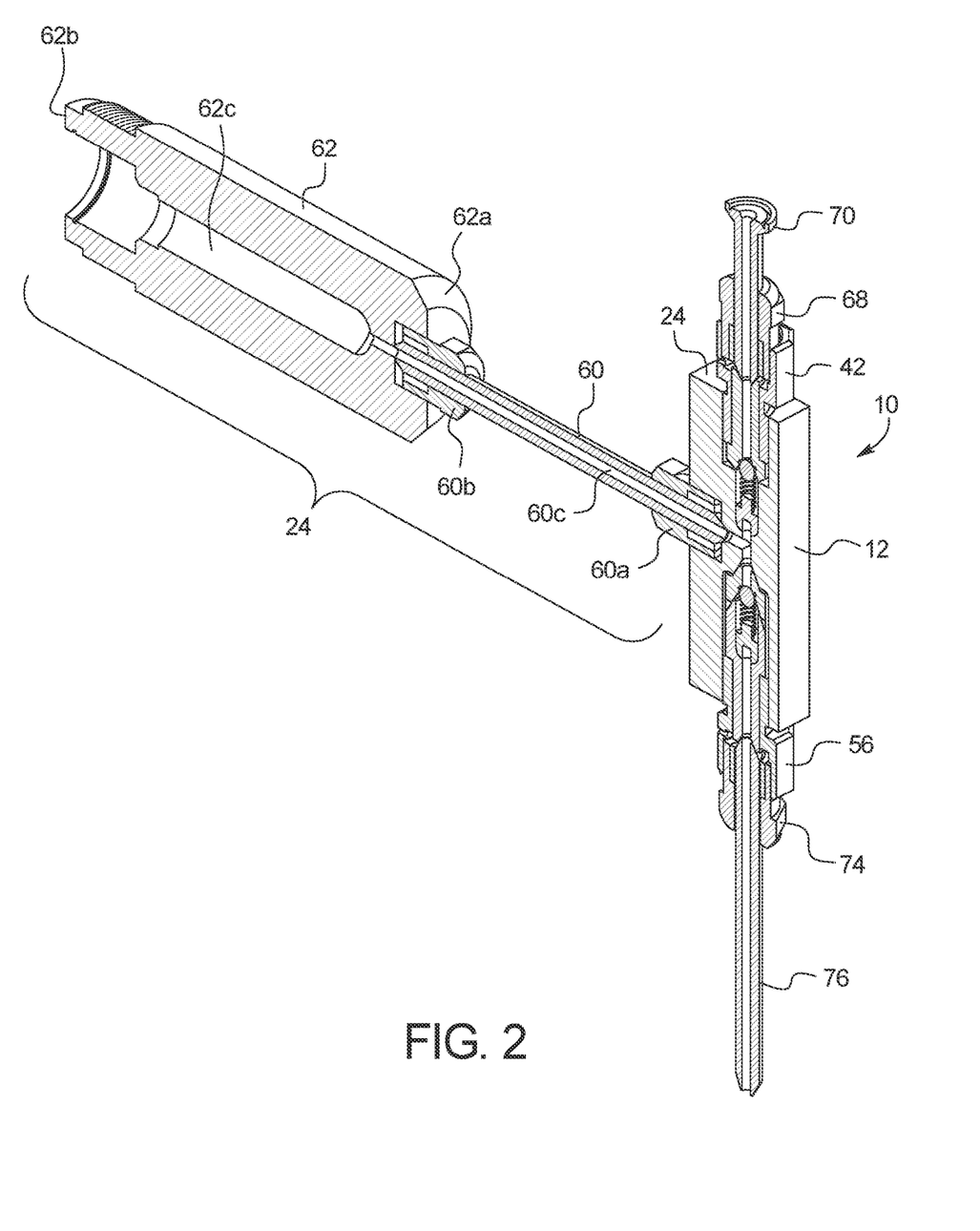
FIG. 2 shows a cross-sectional view of the example embodiment of the check valve assembly of FIG. 1.
Figure 3:
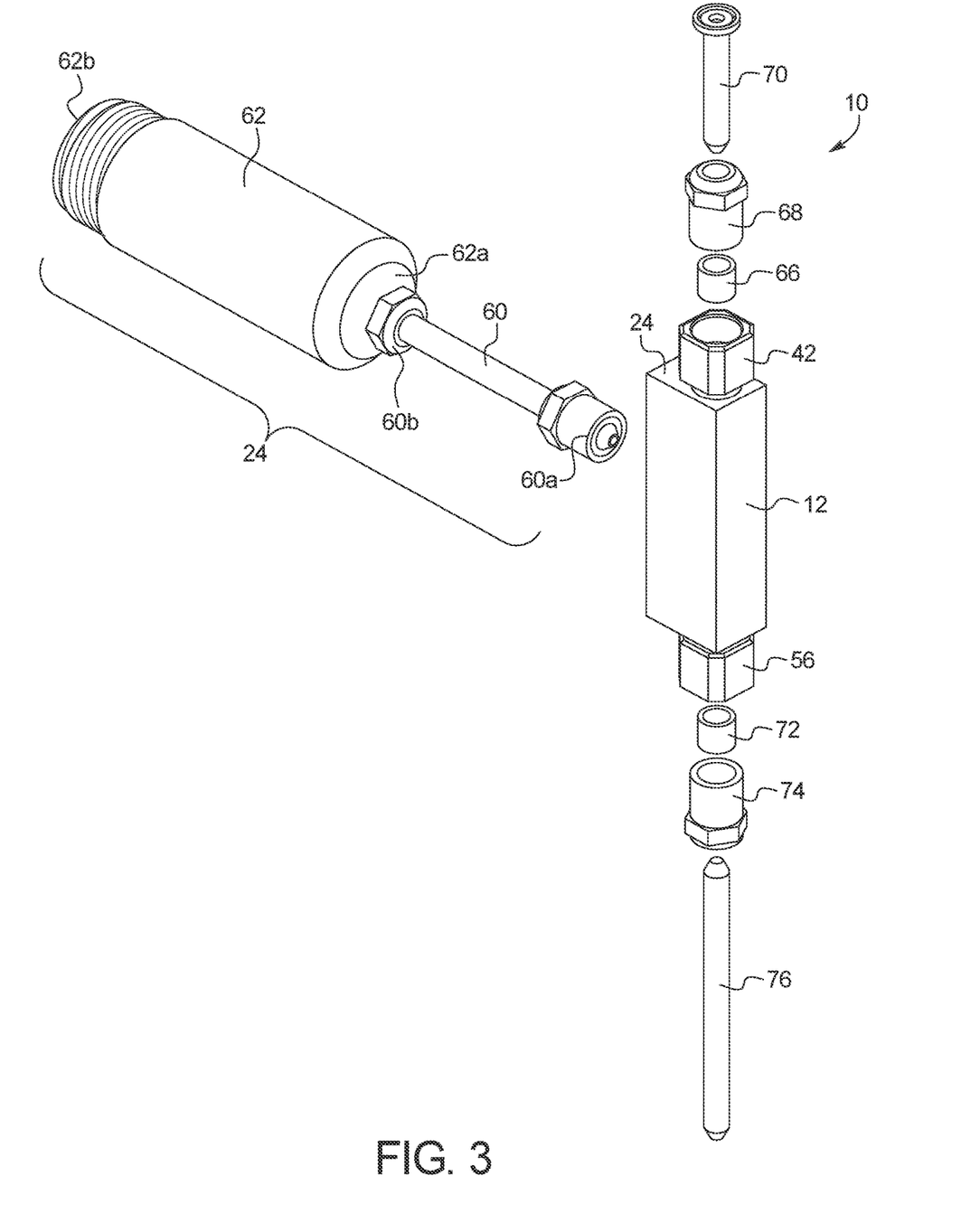
FIG. 3 shows an exploded perspective view of the example embodiment of the check valve assembly of FIG. 1.
Figure 4:
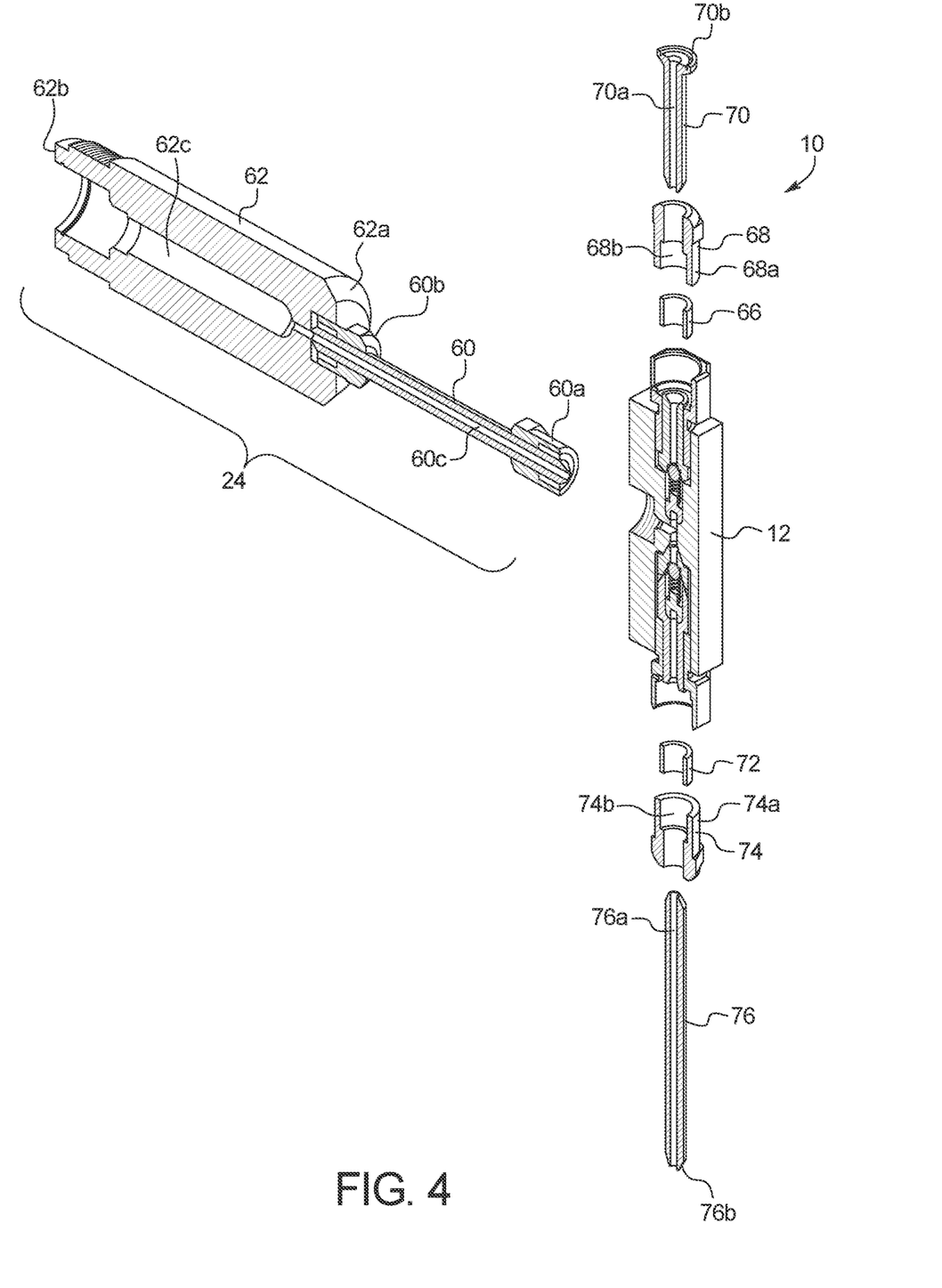
FIG. 4 shows a cross-sectional view of the exploded perspective view of the example embodiment of the check valve assembly of FIG. 1.
Figure 5:
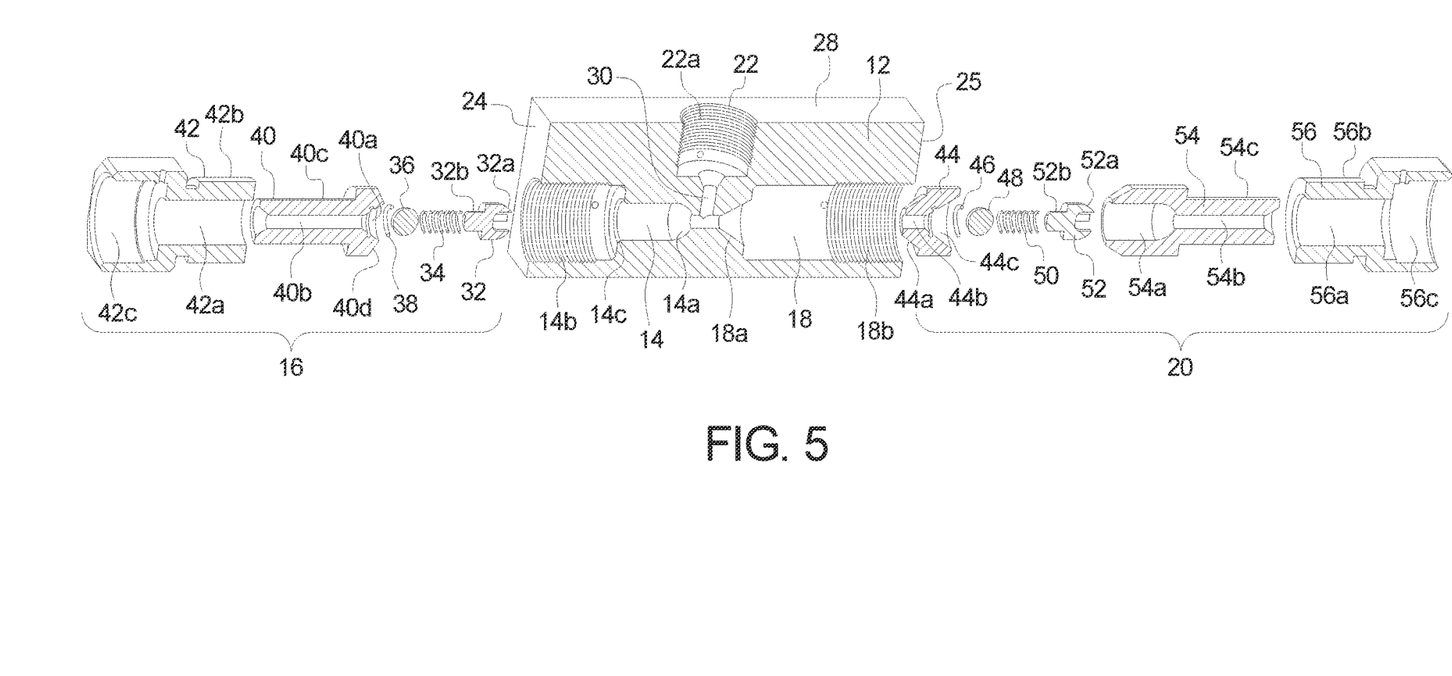
FIG. 5 shows another cross-sectional perspective view of the check valve assembly of FIG. 1.
Figure 6:
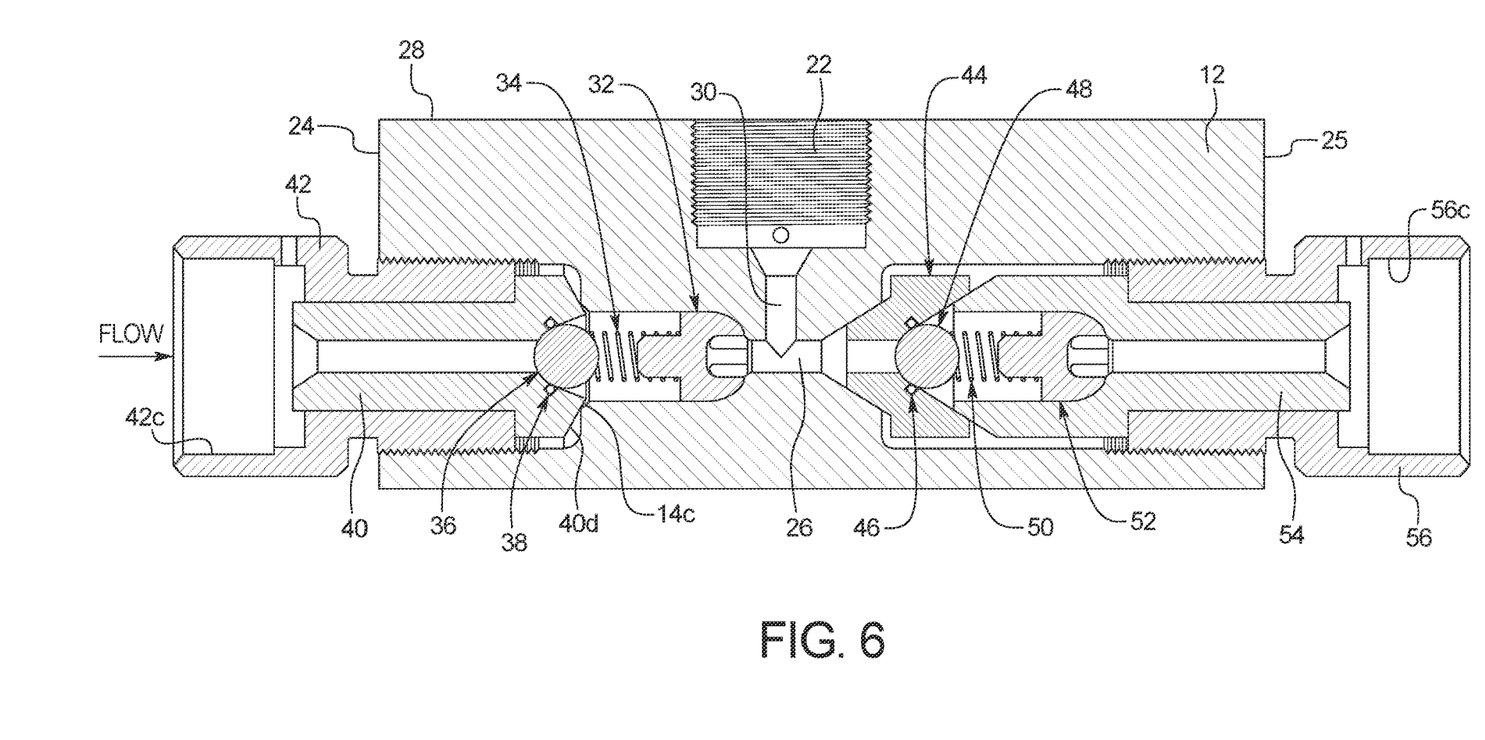
FIG. 6 show a cross-sectional side view of the example embodiment of the check valve assembly of FIG. 1.

As illustrated in FIGS. 1 to 4, a first flowpath is completed by attaching an collar 66, an outer gland 68 and an inlet connection 70 to the end of first subassembly 16. In the illustrated embodiment, an inner surface 42c of first subassembly gland 42 can be threaded to an outer surface 68a of outer gland 68, and collar 66 can be placed against an inner surface 68b of outer gland 68 between inlet connection 70 and outer gland 68. As illustrated in FIG. 2, fluid and/or gas may flow through the first flowpath by flowing through a central channel 70a in inlet connection 70, through central channel 40b of first valve seat 40, to first connecting channel 26. First plug 36 ensures that fluid and/or gas only flows in the direction from inlet connection 70 through first valve seat 40 to first connecting channel 26, and not from first connecting channel 26 through first valve seat 40 to inlet connection 70. The outer end 70b of inlet connection 70 may connect, for example, to a fluid inlet.

First deformable material 38 can include an o-ring or another deformable material that helps create a seal between first plug 36 and first valve seat 40 when first biasing element 34 is extended towards first valve seat 40. It should be understood, however, that an advantage of the present design is that gaskets, o-rings and/or other deformable materials are not needed to seal the space between the outer surfaces of any of the elements of first assembly 16 and the inner surface of first recess 14. As set forth above, the angled surface 40d of first valve seat 40 abuts a corner 14c of first recess 14 in which the diameter of first recess 14c changes, eliminating the need for a gasket, o-ring and/or other deformable material to seal between first valve seat 40 and the inner surface of first recess 14. In an embodiment, first subassembly 16 does not include any gaskets, o-rings and/or other deformable materials. In another embodiment, the only gasket, o-ring and/or other deformable material used in first assembly 16 is first deformable material 38. In another embodiment, there are no gaskets, o-rings and/or other deformable materials inserted into first recess 14 that contact the inner surface of first recess 14.

Second subassembly 20 includes a plurality of parts that together form a second one-way check valve that can be easily inserted into and removed from second recess 18 without disturbing the parts located in other recesses. In the illustrated embodiment, second subassembly 20 includes a second valve seat 44, a second deformable material 46, a second plug 48, a second biasing element 50, a second biasing element retainer 52, a second channel member 54 and a second subassembly gland 56, which can be placed into second recess 18 as shown to form second subassembly 20 and attach second subassembly 20 to body 12. In the illustrated embodiment, second plug 48 is a ball, which in combination with other elements of second subassembly 20 forms a one-way ball valve. Those of ordinary skill in the art will recognize that other geometries besides a ball may be used for second plug 48. In the illustrated embodiment, second biasing element 50 is a spring, but those of ordinary skill in the art will recognize other biasing elements that can be used for second biasing element 50.

In the illustrated embodiment, second valve seat 44 is inserted into second aperture 16 so that an angled, cone-shaped surface 44a of second valve seat 44 is placed against a corresponding angled surface 18a of second recess 18. Cone-shaped surface 44a of second valve seat 44 is advantageous, for example, because it avoids the need for a gasket, o-ring and/or other deformable material to seal the contact between the second valve seat 44 and the second recess 18 and uses a direct surface-to-surface (e.g., metal-metal) contact. As illustrated, angled surface 18a narrows to first connecting channel 26 and is sized to prevent the elements of second subassembly 20 from entering first connecting channel 26. Second plug 48 is placed between second biasing element 50 and second valve seat 44, such that second plug 48 rests in a corresponding indentation 44c of second valve seat 44 when second biasing element 50 is extended towards second valve seat 44. In the illustrated embodiment, second deformable material 46 is placed in its own corresponding indentation in the perimeter of indentation 44c to ensure a fluid tight seal of channel 44b through the center of second valve seat 44 when second biasing element 50 is extended towards second valve seat 44 and second plug 48 is located within indentation 44c, but those of ordinary skill in the art will recognize that second deformable material 46 may not be necessary if second plug 48 is formed to match indentation 44a and provide the fluid tight seal of channel 44b through the center of second valve seat 40.

Second biasing element retainer 52 is inserted into an aperture 54a of second channel member 54 so that a curved surface 52a of second spring retainer 52 is placed against a corresponding curved surface 54a of second channel member 54. As illustrated, curved surface 54a narrows to channel 54b of second channel member 54 and is sized to prevent second biasing element retainer 52 from entering channel 54b. Second biasing element 50, here a spring, is placed against second biasing element retainer 52 around a protrusion 52b on the opposite end of second biasing element retainer 52 as compared to curved surface 52a, though those of ordinary skill in the art will recognize other ways for second biasing element retainer 52 to hold a second biasing element 50 such as a spring. The perimeter 54c of second channel member 54 is placed within an aperture 56a through the center of second subassembly gland 56, and the outer surface 56b of second subassembly gland 56 is threaded onto corresponding threads 18b on the inner surface of second recess 18.

The components of second subassembly 20 are formed so that fluid can flow from first recess 14, through connecting channel 26, and out second recess 18. Second valve seat 44 includes channel 44b through the center thereof to permit fluid flow when indentation 44c is not sealed by second plug 48, and second channel member 54 includes channel 54b through the center thereof to receive the fluid that flows past second plug 48. Second spring retainer 52 also includes an aperture therethrough or indention into an outside thereof to allow fluid to flow from channel 44b of second valve seat 44 to channel 54b of second channel member 54 when indentation 44c is not sealed by second plug 48.

As illustrated in FIGS. 1 to 4, a second flowpath is completed by attaching an collar 72, an outer gland 74 and an outlet connection 76 to the end of second subassembly 20. In the illustrated embodiment, an inner surface 56c of second subassembly gland 56 can be threaded to an outer surface 74a of outer gland 74, and collar 72 can be placed against an inner surface 74b of outer gland 74 between outlet connection 76 and outer gland 74. As illustrated in FIG. 2, fluid and/or gas flows through the second flowpath by flowing from connecting channel 26, through channel 44b of second valve seat 44, through channel 54b of second channel member 54, to channel 76a in outlet connection 76. Second plug 48 ensures that fluid and/or gas only flows in the direction from first connecting channel 26 through second valve seat 44 and second channel member 54 to outlet connection 76, and not in the opposite direction from outlet connection 76 to connecting channel 26. The outer end 76b of outlet connection 76 may connect, for example, to fluid outlet.

Second deformable material 46 can include an o-ring or another deformable material that helps create a seal between second plug 48 and second valve seat 44 when second biasing element 50 is extended towards second valve seat 44. It should be understood, however, that an advantage of the present design is that gaskets, o-rings and/or other deformable materials are not needed to seal the space between the outer surfaces of any of the elements of second assembly 20 and the inner surface of second recess 18. As set forth above, cone-shaped surface 44a of second valve seat 44 helps avoid the need for a gasket, o-ring and/or other deformable material to seal the contact between the second valve seat 44 and the second recess 18. In an embodiment, second subassembly 20 does not include any gaskets, o-rings and/or other deformable materials. In another embodiment, the only gasket, o-ring and/or other deformable material used in second subassembly 20 is second deformable material 46. In another embodiment, there are no gaskets, o-rings and/or other deformable materials inserted into second recess 18 that contact the inner surface of second recess 18.

Third subassembly 24 includes a plurality of parts that together can be easily inserted attached to and removed from third recess 22 without disturbing the parts located in other recesses. In an embodiment, third subassembly 24 couples the first subassembly 16 and second subassembly 20, and the flowpaths through body 12, to a fluid driving mechanism, for example, a pumping piston. In an embodiment, body 12 can be removed from third subassembly 24 without moving third subassembly 24 (e.g., leaving third subassembly 24 attached to another component such as a fluid driving mechanism at an opposite end), and without disturbing the first subassembly 16 and second subassembly 20.

In the illustrated embodiment, the fluid driving mechanism is a piston (not shown), and third subassembly 24 includes a coupling 60 and a piston housing 62. In the illustrated embodiment, an outer surface at a first end 60a of coupling 60 can be threaded into corresponding threads 22a on an inner surface of third recess 22. An outer surface at a second end 60b of coupling 60 can be threaded into corresponding threads on an inner surface of a first end 62a of piston housing 62. Channel 60c through the center of coupling 60 permits liquid and/or gas flow between piston housing 62 and second connecting channel 30 when the piston within piston housing 62 is actuated.

Piston housing 62 includes a central aperture 62a that is configured to receive a piston (not shown) at second end 62b. In an embodiment, second end 62b of piston housing 62 may be attached to a mechanism for actuating the piston back and forth in the direction between first end 62a and second end 62b. When the piston is actuated towards first end 62a (and away from second end 62b), gas and/or fluid is pushed through channel 60c of coupling 60 to second connecting channel 30. When the piston is actuated towards second end 62b (and away from first end 62a), gas and/or fluid is pulled through channel 60c of coupling 60 away from second connecting channel 30.

In use, the piston within piston housing 62 is used to pump fluid from the first flowpath formed by first subassembly 16 through first recess 14 to the second flowpath formed by second subassembly 20 through second recess 16. When the piston is actuated towards second end 62b (and away from first end 62a), the vacuum force created by the piston pulls fluid and/or gas through the first flowpath to first connecting channel 26, and depending on the amount of fluid, also into second connecting channel 30 and/or channel 60c. The force of the fluid and/or gas also causes first plug 36 to compress first biasing element 34 towards first biasing element retainer 32 (down in FIGS. 1 to 4, to the right in FIGS. 5 and 6), which removes the fluid tight seal created by first plug 36 against indentation 40a of first valve seat 40, and allows the fluid and/or gas to pass from channel 40b of first valve seat 40 to first connecting channel 26. When the piston stops and the pressure is released, first biasing element 34 biases first plug 36 back towards indentation 40a to reestablish the fluid tight seal and prevent fluid and/or gas from reentering channel 40b from first connecting channel 26. The above may be referred to as the suction stroke of the piston.

Alternatively, the discharge stroke of the piston occurs when the piston is actuated towards first end 62a (and away from second end 62b). The pressure created by the discharge stroke pushes the fluid and/or gas pulled into first connecting channel 26 during the suction stroke past the first connecting channel 26 and through the second flowpath formed by second subassembly 20. When the fluid and/or gas is being pushed through the second flowpath, the force of the fluid and/or gas causes second plug 48 to compress second biasing element 50 towards second biasing element retainer 52 (down in FIGS. 1 to 4, to the right in FIGS. 5 and 6), which removes the fluid tight seal created by second plug 48 against indentation 44c of second valve seat 44, and allows the fluid and/or gas to pass from channel 44b to channel 54b. When the piston stops and the pressure is released, second biasing element 50 biases second plug 48 back towards indentation 44c to reestablish the fluid tight seal and prevent fluid and/or gas from reentering channel 44b from channel 54b.

By alternating between suction and discharge strokes, fluid and/or gas can be effectively pumped from channel 70a of first inlet connection 70, through the first and second flowpaths formed by the first and second subassemblies, to channel 76a of second outlet connection 76. The two one-way check valves formed by first plug 36 and second plug 48 ensure that the fluid and/or gas is always routed in the correct direction from first inlet connection 70 to second outlet connection 76, or in other words from a fluid inlet to a fluid outlet.

Third subassembly 24 is advantageous, for example, because the piston or other parts of the third subassembly can be replaced without disrupting other parts of assembly 10. As illustrated, the piston does not extend into body 12 during the suction or discharge strokes. The piston remains within piston housing 62, which is located entirely outside of body 12. The piston can be replaced, for example, by detaching coupling 60 from third recess 22, by detaching piston housing 62 from coupling 60, and/or by detaching body 12 from coupling 60 without moving coupling 60, piston housing 22 and/or the piston.

By screwing third subassembly 24 into third recess 22, there is no need to attach third subassembly 24 the outer surface 28 of body 12 by other means, greatly simplifying the attachment and removal of third subassembly 24 and therefore the piston and piston housing 62 for maintenance. It should be understood, however, that other attachment mechanisms can be used.

As set forth above, assembly 10 is advantageous, for example, because each of the first subassembly 16, second subassembly 20 and third subassembly 24 can be separately removable from body 12 so that the components thereof can be individually replaced. Certain components of assembly 10 wear out more frequently and therefore require more frequent replacement than other components, and constructing assembly 10 as described herein allows a quick and easy replacement of just those components, decreasing the cost of and time needed for maintenance.

In an example embodiment, each suction and discharge pump stroke can cause a pressure between 0 and 60,000 psi through the first and/or second flowpaths.

In an embodiment formed with a plurality of check valve assemblies 10, each check valve assembly 10 may include a physically separate body 12, ensuring that maintenance of one body (or flowpaths therethrough) does not disrupt any components of another body (or flowpaths therethrough). The first, second and third subassembly of a first body can each be removed independently of each other, and can also be removed independently of the first, second and third subassemblies of a second, separate body.

In an embodiment, a method of repairing or maintaining a high pressure processing device can include identifying a part that needs replacement and removing only the subassembly needed for the part to replace the part. By unscrewing the necessary subassembly for removal from the respective recess and screwing the necessary subassembly back into the respective recess, the replacement part can be added without disrupting the other elements of the high pressure processing device. And because each body is separate on a design with multiple bodies, the first, second or third subassembly can be removed from one body without disrupting any elements of flowpaths on a second body.

An advantage of assembly 10 is that the number of parts to create a double check valve is significantly reduced. In an embodiment, first subassembly 16 only includes one or more of first biasing element retainer 32, first biasing element 34, first plug 36, first deformable material 38, first valve seat 40, and first subassembly gland 42 as shown and described herein, without the need for any additional parts to be inserted into first recess 14. In an embodiment, second subassembly 18 only includes one or more of a second valve seat 44, second deformable material 46, second plug 48, second biasing element 50, second biasing element retainer 52, second channel member 54 and second subassembly gland 56 as shown and described herein, without the need for any additional parts to be inserted into second recess 18. The parts interface directly with each other as shown in the drawings without the need for intermediate parts or additional parts such as gaskets, o-rings and/or other deformable materials to seal the inner surfaces of the recesses.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

We claim:

1. A method of repairing a high pressure processing device including a body having a first surface with a first recess and a second surface with a second recess, a first subassembly inserted into the first recess and a second subassembly inserted into the second recess, the first subassembly including a first plug configured to form a one-way valve in combination with a first valve seat, the second subassembly including a second plug configured to form a one-way valve in combination with a second valve seat, and a third removable subassembly coupling the body to a fluid driving mechanism via a threaded connection, wherein the fluid driving mechanism is a pressure pump including a piston housing and a piston actuatable within an inner compartment of the piston housing, the method comprising:
   removing one of the first subassembly and second subassembly from the body independently of the other of the first subassembly and second subassembly and independently of the third subassembly;
   replacing a part of the removed first subassembly or second subassembly; and
   reattaching the removed first subassembly or second subassembly that includes the replacement part.

2. The method of claim 1, wherein the first recess is fluidly connected to the second recess by a connecting channel such that the first recess, second recess and connecting channel form an aperture extending through the body from the first outer surface to the opposite second outer surface.

3. The method of claim 1, wherein replacing the part of the removed first subassembly includes replacing one or more of a first biasing element retainer, a first biasing element, a first plug, a first deformable material, a first valve seat, and a first subassembly gland of the first subassembly.

4. The method of claim 1, wherein replacing the part of the removed second subassembly includes replacing one or more of a second valve seat, a second deformable material, a second plug, a second biasing element, a second biasing element retainer, a second channel member, and a second subassembly gland of the second subassembly.

5. The method of claim 1, further comprising identifying the part to be replaced prior to removing one of the first subassembly and second subassembly.

6. The method of claim 1, wherein the part of the removed first subassembly or second subassembly is replaced while the other of the first subassembly and second subassembly remains inserted into the first recess or second recess respectively.

7. The method of claim 1, wherein removing one of the first subassembly and the second subassembly includes unthreading the first subassembly from interior threading of the first recess of the body or unthreading the second subassembly from interior threading of the second recess of the body.

8. A method of repairing a high pressure processing device including a body, a first subassembly including a first check valve, a second subassembly including a second check valve, and a third subassembly coupling the body to a fluid driving mechanism, the method comprising:
   removing one of the first subassembly, second subassembly and third subassembly from the body independently of the others of the first subassembly, second subassembly and third subassembly;
   replacing a part of the removed first subassembly, second subassembly or third subassembly; and
   reattaching the removed first subassembly, second subassembly or third subassembly that includes the replacement part, wherein the fluid driving mechanism is a pressure pump including a piston housing and a piston actuatable within an inner compartment of the piston housing.

9. The method of claim 8, wherein removing one of the first subassembly, second subassembly and third subassembly from the body includes unthreading the one of the first subassembly, second subassembly and third subassembly from an inner surface of a recess of the body.

10. The method of claim 8, wherein reattaching the removed first subassembly, second subassembly or third subassembly with the replacement part includes threading the removed first subassembly, second subassembly or third subassembly to an inner surface of a recess of the body.

11. The method of claim 8, which includes removing the first subassembly from the body independently of the second subassembly and the third subassembly, and wherein replacing a part of the first subassembly includes replacing one or more of a first biasing element retainer, a first biasing element, a first plug, a first deformable material, a first valve seat and a first subassembly gland of the first subassembly.

12. The method of claim 11, wherein removing the first assembly includes unthreading the first subassembly gland of the first subassembly from an inner surface of a recess of the body.

13. The method of claim 8, which includes removing the second subassembly from the body independently of the first subassembly and the third subassembly, and wherein replacing a part of the second subassembly includes replacing one or more of a second valve seat, a second deformable material, a second plug, a second biasing element, a second biasing element retainer, a second channel member and a second subassembly gland of the second subassembly.

14. The method of claim 13, wherein removing the second assembly includes unthreading the second subassembly gland of the second subassembly from an inner surface of a recess of the body.

15. The method of claim 8, which includes removing the third subassembly from the body independently of the first subassembly and the second subassembly and wherein replacing a part of the third subassembly includes replacing one or more of a piston, a piston housing and a coupling of the third assembly.

16. A method of repairing a high pressure processing device including a body, a first subassembly including a first check valve, a second subassembly including a second check valve, and a third subassembly coupling the body to a fluid driving mechanism, the method comprising:
   removing the third subassembly from the body independently of the first subassembly and second subassembly wherein removing the third subassembly includes unthreading a coupling of the third subassembly from an inner surface of a recess of the body;

replacing a part of the removed first subassembly, second subassembly or third subassembly; and reattaching the removed first subassembly, second subassembly or third subassembly that includes the replacement part.

17. A method of repairing a high pressure processing device including a body, a first subassembly including a first check valve, a second subassembly including a second check valve, and a third subassembly coupling the body to a fluid driving mechanism, the method comprising:

removing the third subassembly from the body independently of the first subassembly and second subassembly wherein removing the third subassembly includes unthreading the body from a coupling of the third subassembly while leaving the third subassembly attached to a fluid driving mechanism at an end of the third subassembly different than the coupling;

replacing a part of the removed first subassembly, second subassembly or third subassembly; and reattaching the removed first subassembly, second subassembly or third subassembly that includes the replacement part.

18. A method of repairing a high pressure processing device including a body, a first subassembly including a first check valve, a second subassembly including a second check valve, and a third subassembly coupling the body to a fluid driving mechanism, the method comprising:

removing the third subassembly from the body independently of the first subassembly and second subassembly;

replacing a part of the removed third subassembly, wherein replacing the part of the removed third subassembly includes detaching a piston housing of the third subassembly from a coupling of the third subassembly; and reattaching the removed third subassembly that includes the replacement part.

19. The method of claim 16, wherein the fluid driving mechanism is a pressure pump including a piston housing and a piston actuatable within an inner compartment of the piston housing.

20. A method of repairing a high pressure processing device including a body, a first subassembly including a first check valve, a second subassembly including a second check valve, and a third subassembly coupling the body to a fluid driving mechanism, wherein the fluid driving mechanism is a pressure pump including a piston housing and a piston actuatable within an inner compartment of the piston housing, the method comprising:

removing the third subassembly from the body independently of the first subassembly and second subassembly wherein the piston remains entirely within the inner compartment of the piston housing during suction or discharge strokes of the piston thereby enabling the third subassembly to be removed from the body independently of the first subassembly and the second subassembly;

replacing a part of the removed first subassembly, second subassembly or third subassembly; and reattaching the removed first subassembly, second subassembly or third subassembly that includes the replacement part.

* * * * *